Sept. 2, 1958     R. M. SOEHNLEN ET AL     2,850,045

PIPE LEAK SEALING DEVICE

Filed Jan. 15, 1954

INVENTORS.
ROBERT M. SOEHNLEN
EUGENE ALTERS
BY
ATTORNEY.

United States Patent Office 2,850,045
Patented Sept. 2, 1958

2,850,045
PIPE LEAK SEALING DEVICE
Robert M. Soehnlen, Beloit, and Eugene Alters, Fond du Lac, Wis.
Application January 15, 1954, Serial No. 404,349
1 Claim. (Cl. 138—99)

Our invention relates to an improved method of sealing off leaks in pipes and the repair means therefor.

Our invention relates more particularly to a novel and practical way of sealing off leaks in fluid pipes for gas or similar substances without interrupting the continuous flow of the fluid through the pipes.

As is well known in the art, leaks or cracks develop in the walls of fluid carrying pipes, and the repairs must be made without stopping the flow of the gas or fluid through the pipes. Sealing off an area surrounding the leak is a quick and satisfactory way of stopping the escape of the fluid. We have devised a method of accomplishing this by the use of a comparatively simple sleeve and gasket or sealing ring means which can be applied very quickly and will effect a permanent seal around the area of the leak. Since the steps for carrying out this method are also comparatively simple, no highly trained maintenance men are required.

For a more comprehensive understanding of this method and the sealing means employed, reference is had to the accompanying drawings, upon which Fig. 1 is a fragmentary side elevational view of a steel gas pipe which has been repaired to seal the area around a leak with our improved method and sealing means;

Figure 1:
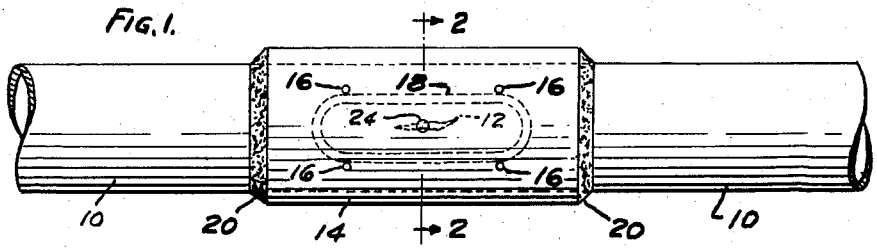

In Fig. 1 of the drawings we have shown a portion of a steel gas or other fluid carrying pipe 10 which has developed a crack 12 on one side of the same. In order to seal off the area around the crack while gas or fluid is passing through the pipe, we provide a semi-cylindrical or half-sleeve member 14 which may be of a length to extend well beyond both ends of the crack or leak in the pipe 10.

The sleeve 14 may be provided with several dowel pins or studs 16 spaced as shown to receive within their confines an elongated O-shaped rubber ring or gasket 18. The sealing ring as shown is to surround the area of the crack or hole in the pipe 10. The sleeve 14 is now applied to the side of the pipe 10 and pressed against the same so that the rubber ring 18 is compressed to form an effective seal between the inner wall of the sleeve 14 and the outer wall of the pipe 10.

The sleeve may now be welded as shown at 20 about its entire periphery, directly to the outside wall of the pipe 10. A hole 22 is provided through the wall of the sleeve 14, and rubber cement, such as the plastic base compound known as polysulfide elastomer, is now directed through the opening 22 to fill up the complete area within the confines of the O-ring 18. After this has been done a plug 24 may be placed in the hole and secured by welding or otherwise.

Figures 2, 4:
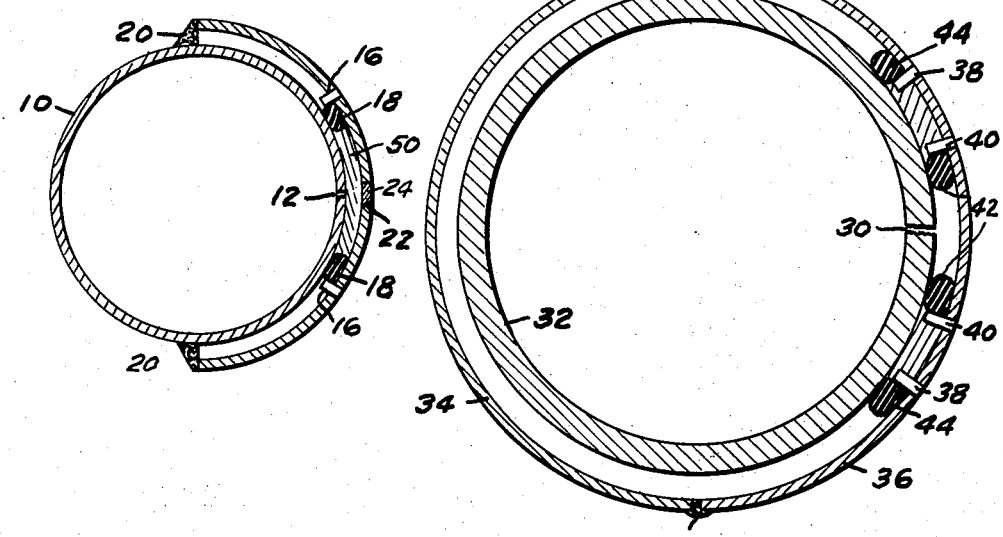
Fig. 2 is a cross-sectional view thereof taken on the line 2—2 of Fig. 1.
Fig. 4 is a cross-sectional view thereof taken on the line 4—4 of Fig. 3.
Figure 3:
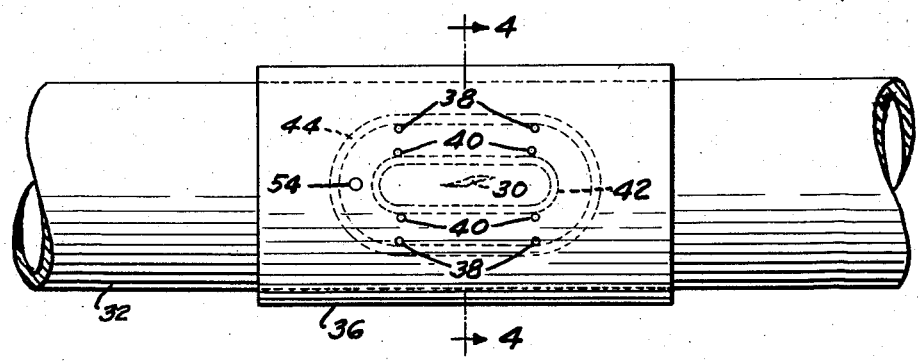
Fig. 3 is a fragmentary side elevational view of a piece of cast iron pipe which has been repaired to seal off the area around a leak.

In Figs. 3 and 4 we have shown the method by which a crack or hole 30 in the cast iron pipe 32 can be sealed off. A pair of similar half-sleeves 34 and 36 are adapted to be placed about the pipe 32, each half sleeve portion having fastened to its inside wall two sets of dowel pins or studs 38 and 40, the inner set of pins 40 being for the purpose of supporting an inner O-ring 42, and the outer set of dowel pins 38 being for the purpose of supporting a larger O-ring 44, both in a manner similar to that of the embodiment of Figures 1 and 2. The sleeves are placed about the pipe 32 and welded together at 46 and 48 after O-rings 42 and 44 have been applied thereto. The O-rings 42 and 44 are compressed so that two areas, one within the O-ring 42 and one between the two O-rings 42 and 44 are effectively sealed.

Rubber cement 50 is now introduced in the space between the two O-rings through a suitable opening 54 which is closed by a plug or otherwise after the rubber cement has been introduced. The leak 30 is now effectively sealed by means of the disposition of the two O-rings and the rubber cement that has been placed between the same.

Two half-sleeves are necessary whenever cast iron pipe is being repaired, due to the fact that the steel sleeves can not be welded to the cast iron and they must therefore be welded to each other. While in working on steel pipe it is possible to effectively seal off the area around a leak by the use of only a half sleeve, a whole sleeve can also be used if desired. It is also optional to use one or two sealing rings when working on steel pipe.

When the work is being done on pipes in which the pressure is low, it is not necessary to have the gas or other fluid escape while the work is being done, because the pressing of the sleeve against the pipe, together with the compression of the ring seal is sufficient to keep the gas from escaping. However, if the work is being done on pipes in which the fluid pressure is comparatively high, such as 150 to 200 pounds, it is necessary to use a "Save a Valve" unit, which is usually attached to the pipe to be repaired, the unit generally including an extension pipe or exhaust which extends upwardly from the pipe so that the escaping gas will not interfere with the repairs, and it also eliminates the danger of an explosion or a fire. This apparently is well known in the art.

From the above and foregoing description it can be seen that we have provided a comparatively simple yet highly effective method of sealing off leaks which may develop in fluid lines, a method which may be practiced while fluid is passing through the lines, as is necessary for the repair of gas mains and similar community service installations. The means employed are also comparatively simple, consisting only of a half-sleeve or two half-sleeves, and one or two O-rings to confine the rubber cement that is introduced. We contemplate that changes and modifications may be made in the exact details shown and we do not wish to be limited in any particular; rather what we desire to secure and protect by Letters Patent of the United States is:

A device for sealing a leak in a conduit of circular cross-section comprising a steel plate sleeve member of substantially uniform thickness formed in substantially half-cylindrical shape on a radius slightly longer than that of the outer surface of the conduit to be sealed, a plurality of dowel pins each of substantially cylindrical shape projecting radially inwardly from the sleeve member a distance substantially less than the excess of the radius of the sleeve member over the radius of the outer surface of the conduit, said pins being spaced apart around an area of the inner surface of the sleeve member adapted to overlie the leak to be sealed, and an O-ring of rubberlike material having a cross-sectional diameter greater than the length of said pins and having spaced points on its outer periphery engaged with said pins whereby the pins support the O-ring in the sleeve member for sealing the conduit when the sleeve member is secured to the conduit with the O-ring surrounding the leak and deformed by compression between the sleeve member and the conduit.

References Cited in the file of this patent

UNITED STATES PATENTS

| | | |
|---|---|---|
| 802,276 | Fitzgerald | Oct. 17, 1905 |
| 850,230 | Kieble | Apr. 16, 1907 |
| 1,027,565 | Ramage | May 28, 1912 |
| 1,590,580 | Hume | June 29, 1926 |
| 2,272,621 | Merrill | Feb. 10, 1942 |
| 2,307,148 | McGuire | Jan. 5, 1943 |
| 2,492,507 | Tipton | Dec. 27, 1949 |
| 2,522,171 | Furman et al. | Sept. 12, 1950 |
| 2,655,946 | Morris | Oct. 20, 1953 |
| 2,660,200 | Corey | Nov. 24, 1953 |

FOREIGN PATENTS

| | | |
|---|---|---|
| 13,709 | Great Britain | July 5, 1901 |
| 468,898 | Great Britain | July 15, 1937 |